United States Patent [19]

Ross

[11] Patent Number: 5,223,002

[45] Date of Patent: Jun. 29, 1993

[54] METHOD OF MAKING POLYANILINE SOLID ELECTROLYTE CAPACITOR

[75] Inventor: Sidney D. Ross, Williamstown, Mass.

[73] Assignee: Sprague Electric Company, North Adams, Mass.

[21] Appl. No.: 786,315

[22] Filed: Oct. 31, 1991

[51] Int. Cl.⁵ .............. H04R 17/00; H01G 7/00; H01G 9/00

[52] U.S. Cl. .................. 29/25.03; 361/523; 29/25.42

[58] Field of Search ............ 29/25.03; 361/527, 525, 361/523

[56] References Cited

U.S. PATENT DOCUMENTS 4,780,796 10/1988 Fukuda et al. .................. 361/433
4,803,596 2/1989 Helwig et al. .................. 29/25.03

OTHER PUBLICATIONS

MacDiarmid, Alan G.; Epstein, Arthur J., Faraday Discussions of the Chemical Society, 1989, 88, 317–332.

Primary Examiner—Olik Chaudhuri
Assistant Examiner—Ramamohan R. Paladugu

[57] ABSTRACT

Highly conducting polyaniline is produced in situ in a tantalum capacitor by subjecting an excess of monomeric aniline to a solution having a low concentration of ammonium persulfate reagent. The monomer is oxidized by the reagent in preference to the polymer, so that the presence of excess monomer protects the polymer as it is produced against further oxidation to a less conductive species.

5 Claims, No Drawings

METHOD OF MAKING POLYANILINE SOLID ELECTROLYTE CAPACITOR

BACKGROUND OF THE INVENTION

This invention relates to a method for producing polyaniline in situ in a solid electrolyte capacitor, and more particularly to such a method for producing highly conducting polyaniline in a porous pellet.

Solid electrolyte capacitors have scarcely changed with respect to electrolyte production since their introduction to the market in 1956. The electrolyte of choice then and now is manganese dioxide which is produced within oxidized porous pellets by repeated in situ pyrolytic decompositions of manganous nitrate at temperatures around 300° C. The elevated pyrolysis temperature requires the capacitor to be rated for use in a circuit at a fraction of the voltage used to form the dielectric oxide layer in the pellet.

Efforts to employ electrolytes other than manganese dioxide have centered on TCNQ complexes because of their higher conductivity. However, efforts to commercialize TCNQ capacitors have not progressed notably beyond the initial work of Ross et. al. in U.S. Pat. No. 3,214,648 and U.S. Pat. No. 3,214,650 because the instability of TCNQ complexes makes capacitor production difficult.

More recently, hetrocyclic polymers have been studied; again, because they offer conductivities much higher than manganese dioxide. Again, as with TCNQ complexes, these polymers introduce production difficulties into capacitor manufacture because their wide range of conductivities from conductor to insulator requires stringent controls to ensure useful capacitor electrolytes.

SUMMARY OF THE INVENTION

It is an object of this invention to provide a method for producing a high conductivity polymer within a porous capacitor pellet. Another object is to provide a method that is simple to control and which is easily reproducible in manufacture of capacitors.

In accordance with this invention a method for producing highly conducting polyaniline in situ in porous pellets involves introducing polyaniline in situ in porous pellets involves introducing aniline monomer into the pellet and thereafter polymerizing the monomer by a persulfate reagent which contains substantially less than enough persulfate to oxidize all of the aniline monomer.

Polyaniline is the polymer of choice in this invention because of its conductivity which is two orders of magnitude greater than manganese dioxide. This greater conductivity is reflected in improved capacitor properties, particularly in lower ESR values. Even more important, unlike manganese dioxide, which is prepared in situ in capacitor sections by the pyrolytic decomposition of manganous nitrate at temperatures ranging from 270-350° C., polyaniline can be prepared from monomeric aniline at room temperature either by anodic oxidation or by chemical oxidation with ammonium persulfate in aqueous acid.

Chemical oxidation at room temperature in a suitable method for generating polyaniline in situ in solid tantalum capacitor sections. The use of mild reaction conditions to generate polyaniline obviates both the thermal and chemical damage to the anodic oxide film that accompany the pyrolysis reaction that converts manganous nitrate to manganese dioxide. In addition to the thermal damage due to the elevated pyrolysis temperatures there is also significant chemical attack due to the corrosive oxides of nitrogen that are generated by the pyrolysis reaction.

Since the elimination of the high temperature pyrolysis reactions avoids both the resultant thermal and chemical degradation of the tantalum pentoxide dielectric, it is possible to diminish significantly the present wide differential between the formation voltage used in generating the anodic oxide and the maximum operating voltage for which the finished capacitor is rated. This results in obvious savings of tantalum metal and in improved volumetric efficiency.

The electrochemical method for producing polyaniline has not been proven suitable for the foregoing purpose. To successfully impregnate a solid tantalum capacitor section it is necessary to introduce the polyaniline electrolyte on and in the pores of the tantalum pentoxide dielectric on the tantalum anode. The electrochemical preparation of polyaniline is an anodic process, but the highly resistive tantalum pentoxide dielectric on the anode surface severely limits the amount of charge that ca be passed and makes it impossible to deposit any significant amount of polyaniline on the anode.

The chemical preparation of polyaniline, in particular the reaction of monomeric aniline with ammonium persulfate in 1N sulfuric acid, is more suitable to the purpose of this invention. The reaction is facile even at room temperature. In a typical preparation aniline (5.0 cc; 5.11 g; 0.0549 moles) was added to 250 ml of 1N sulfuric acid, and the mixture was stirred with a magnetic stirring bar. Ammonium persulfate (20.0 g, 0.0876 moles) dissolved in water (50 ml) was added, and the mixture was stirred for 1.5 hours. The black polymer that formed was filtered, washed copiously with 1N sulfuric acid and dried in a vacuum oven over sulfuric acid at 125° C. The yield of product was 6.1 g, and the resistivity, measured in a glass capillary tube, with pressure applied from both sides by gold plated steel rods, was 0.43 ohm-cm.

However, even this simple preparative procedure has associated with it difficulties which must be addressed and overcome. The observed product resistivities are strongly dependent on the initial molar ratio of ammonium persulfate to aniline used in the preparative reaction. At a low molar ratio of ammonium persulfate to aniline (1.0 or lower) the polymers are highly conducting; at intermediate ratios (1-1.6) the products show increasing resistivities, and at still higher ratios (2 and above) the products are tending to become insulators. Table I reports the results of a series of preparations, all starting with 0.0549 mole of aniline, both with varying amounts of ammonium persulfate used in the oxidation.

TABLE I

| | Polyaniline Prepared by Oxidation of Aniline with Ammonium Persulfate | | | |
|---|---|---|---|---|
| Moles Aniline | Moles Ammonium Persulfate | Molar Ratio Persulfate/ Aniline | Wt. Product Grams | Resistivity ohm-cm at Rm. T. |
| 0.0549 | 0.1096 | 2.00 | 4.9 | $8.7 \times 10^2$ |
| .0549 | .0876 | 1.60 | 6.1 | 0.430 |
| .0549 | .0789 | 1.44 | 7.4 | 0.053 |
| .0549 | .0526 | 0.96 | 5.7 | 0.037 |
| .0549 | .0351 | 0.64 | 3.8 | 0.036 |
| .0549 | .0219 | 0.40 | 2.5 | 0.028 |

Even more disturbing, when a sample of polyaniline (2 g), having a resistivity of 0.037 ohm-cm was suspended in 1N sulfuric acid (50 ml) and treated with ammonium persulfate (5 g) dissolved in water (50 ml), the resistivity of the polymer that resulted from this additional persulfate treatment increased to $10^9$ ohm-cm. In another experiment a sample of polyaniline (5 g), having a room temperature resistivity of 0.063 ohm-cm, was further oxidized with ammonium persulfate (5 g) in 1N sulfuric acid (100 ml). The produce weighed 2.3 g and its resistivity had increased to $2.4 \times 10^6$ ohm-cm. This presages ill for an impregnation process that requires many steps and multiple treatments with the ammonium persulfate reagent, because the highly conducting polyaniline formed in the early impregnation steps will be converted to a non-conducting state by further contact with ammonium persulfate during the later impregnation steps.

Inasmuch as ammonium persulfate reacts much more rapidly with monomeric aniline than it does with polyaniline and if we design our impregnation sequences such that excess aniline monomer is always present when the system is subjected to the ammonium persulfate reagent, the presence of the monomer will protect the polymer against further oxidation.

The following series of experiments demonstrates that the monomer is oxidized in preference to the polymer and that the presence of the monomer protects the polymer against adverse further oxidation. Aniline (5.0 ml; 5.11 g; 0.055 mole) in 250 ml of 1N sulfuric acid was oxidized by addition of a solution of ammonium persulfate (12.6 g; 0.055 mole), followed by magnetic stirring for 4 hours. The black polymer obtained weighted 6 g and has a resistivity of 0.012 ohm-cm.

Another identical preparation of polyaniline was carried out, but this time 5 g of the above product (resistivity 0.012 ohm-cm) was added ab initio along with the monomeric aniline and persulfate. The yield of the combined products was 9 g having a resistivity of 0.063 ohm-cm. This represents a modest and tolerable increase in resistivity, particularly in view of the long reaction time (4 hours) and the relatively large amount of the persulfate reagent used. This result is to be compared with the very large increases in resistivity, 9–11 order of magnitude, (vide supra) observed when polyaniline was subjected to the ammonium persulfate reagent in the absence of monomeric aniline.

The foregoing experiments provide a basis for a strategy that permits the successful impregnation of solid tantalum sections and guarantees that all of the polyaniline in the sections will remain in a highly conducting state. The essential requirements are that:

(1) the capacitor sections are contacted with the ammonium persulfate reagent only in the presence of adequate amounts of aniline monomer; and (2) the ammonium persulfate solutions in 1N sulfuric acid used to oxidize the monomeric aniline contain only modest concentrations of ammonium persulfate.

To demonstrate the validity of the foregoing considerations a bar containing 25 wire pellet units anodized to 200 volts was impregnated according to the above requirements. A wet check on one of the units in 40% sulfuric acid indicated a capacity of 10.6 nanofarads at 1 Khz and a dissipation factor of 0.01. The impregnation sequence used is shown in Table II.

Table II

Impregnation Sequence for Solid Tantalum Capacitors

1. Impregnated in 1:1 aniline-methanol
2. Dry in 100° C. oven
3. Immerse in solution of 8 g ammonium persulfate in 100 ml 1N sulfuric acid for 30 minutes
4. Wash in 1N sulfuric acid and then in water
5. Dry in 100° C. oven
6. Repeat above cycle (steps 1-5)
7. Impregnate in pure analine
8. Drain at room temperature 10 minutes
9. Immerse in solution of 10 g ammonium persulfate in 100 ml 1N $H_2SO_4$ for 30 minutes
10. Wash in 1N sulfuric acid then in water
11. Dry in 100° C. oven
12. Repeat above cycle (steps 7-11) two additional times The use of methanol in step 1 of the foregoing impregnation sequence is as a diluent to ensure wetting of the pores of the pellet with the monomer. The temperature in step 2 is the temperature needed to drive off only the methanol diluent, viz the temperature needs to be less than the boiling point of the monomer and greater than the boiling point of the diluent.

The difference in persulfate concentration between steps 3 and 9 is selected because of the difference between the diluted monomer in step 1 and the pure monomer in step 7. Again what is accomplished in this example of the invention is keeping an excess of monomer in the pellet beyond what the persulfate can oxidize.

What is claimed is:

1. A method for producing a polyaniline solid electrolyte in a porous pellet comprising
(a) impregnating said pellet with a solution of monomeric aniline and a diluent,
(b) heating to a temperature sufficient to drive off said diluent and leave said aniline, and
(c) immersing said pellet in a solution of ammonium persulfate and sulfuric acid having a concentration of persulfate that is substantially less than needed to oxidize all of said monomeric aniline so as to thereby polymerize less than all of said monomeric aniline.

2. The method of claim 1 wherein said diluent is methanol in a ratio of 1:5 of said aniline and said methanol, and said temperature is between 100° and 200° C.

3. The method of claim 1 wherein said concentration if 5 to 12 grams ammonium persulfate per 100 ml 1N sulfuric acid.

4. The method of claim 1 wherein said persulfate and said aniline are present in a molar ratio of persulfate/aniline of less than 1.

5. The method of claim 1 wherein at least one impregnation subsequent to said impregnating step is in pure aniline and the concentration of persulfate is higher than said concentration while still substantially less than enough to oxidize all of said subsequent pure aniline.

* * * * *